Jan. 26, 1932. G. M. HARRISON 1,842,605
HOE BLADE
Filed Dec. 17, 1928  2 Sheets-Sheet 1

Inventor
George M. Harrison.
By
Attorney

Jan. 26, 1932.  G. M. HARRISON  1,842,605
HOE BLADE
Filed Dec. 17, 1928  2 Sheets-Sheet 2
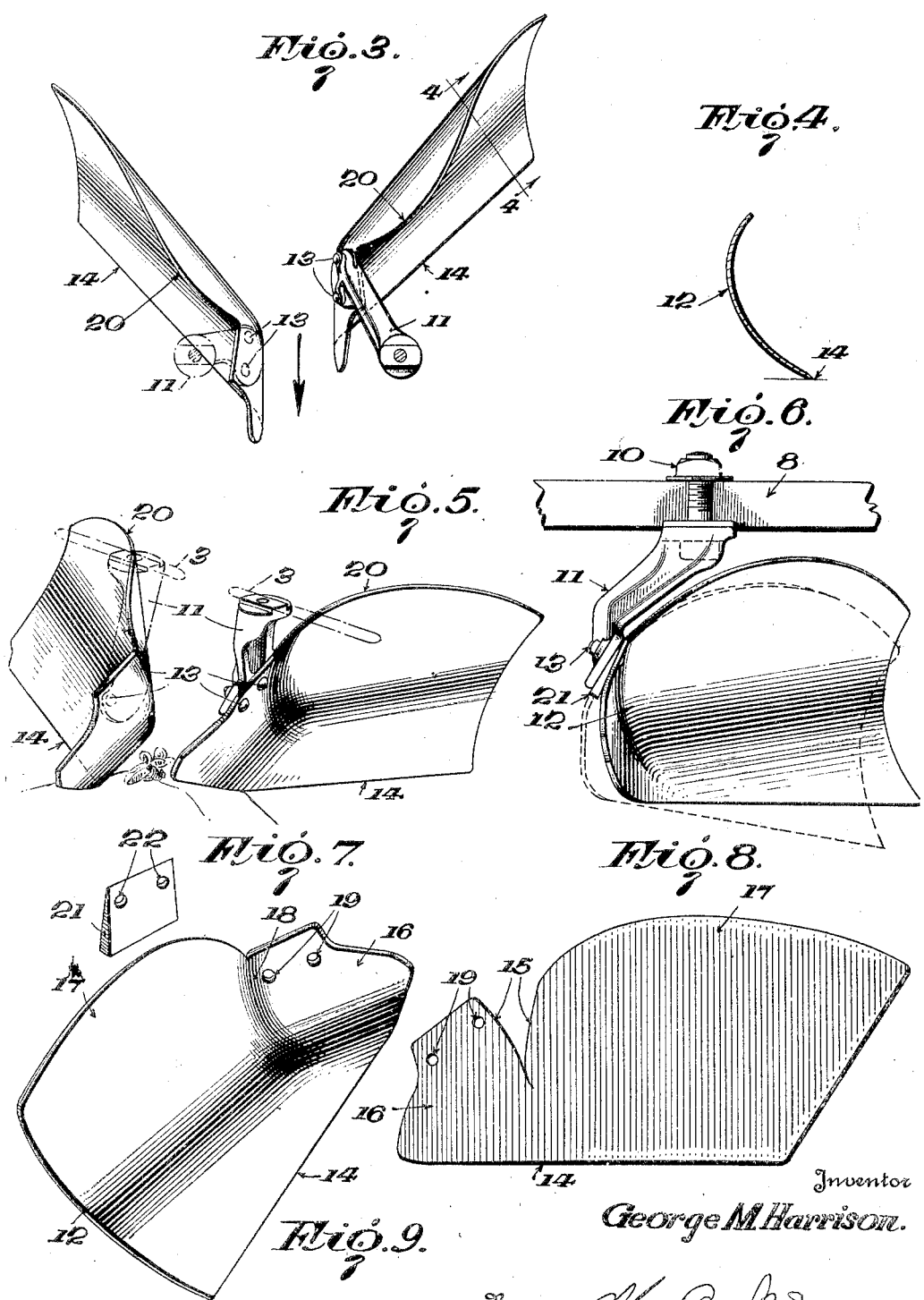

Patented Jan. 26, 1932

1,842,605

UNITED STATES PATENT OFFICE

GEORGE M. HARRISON, OF SUITLAND, MARYLAND

HOE BLADE

Application filed December 17, 1928. Serial No. 326,637.

The present invention relates to wheeled hoes and more particularly to the construction of the hoe blade adapted for use with hand operated wheel hoes for use in weeding rows of young plants.

The present type of wheel hoe used in hand work has proven totally inefficient in destroying the weeds and grass growing at the sides of the row of plants and the same merely cuts through the soil immediately beneath the surface so that the grass and weeds will fall behind the blade on top of the soil after the hoe has passed on. Where the soil contains any degree of moisture, these weeds and grass will immediately again take root so that the operation must be repeated continuously in order that the growing plants may be kept free from the weeds and grass.

It is accordingly the purpose of my present invention to provide a hoe blade which will not only cut under the weeds and grass at the sides of the growing plants but will also turn the weeds over and work the same into the furrow at the side of the row and cover the same with the soil whereby to prevent the weeds from again taking root. For this purpose, it is an object of the invention to embody a sweep in combination with the hoe and casting the sweep and hoe blade integrally.

A still further object is to provide a blade of this character which may be easily and quickly attached in operative position upon a wheel hoe of conventional construction without necessitating any changes or alterations in the construction thereof and which is capable of being manufactured at a relatively low cost and in a simple and practical manner.

Figure 1:
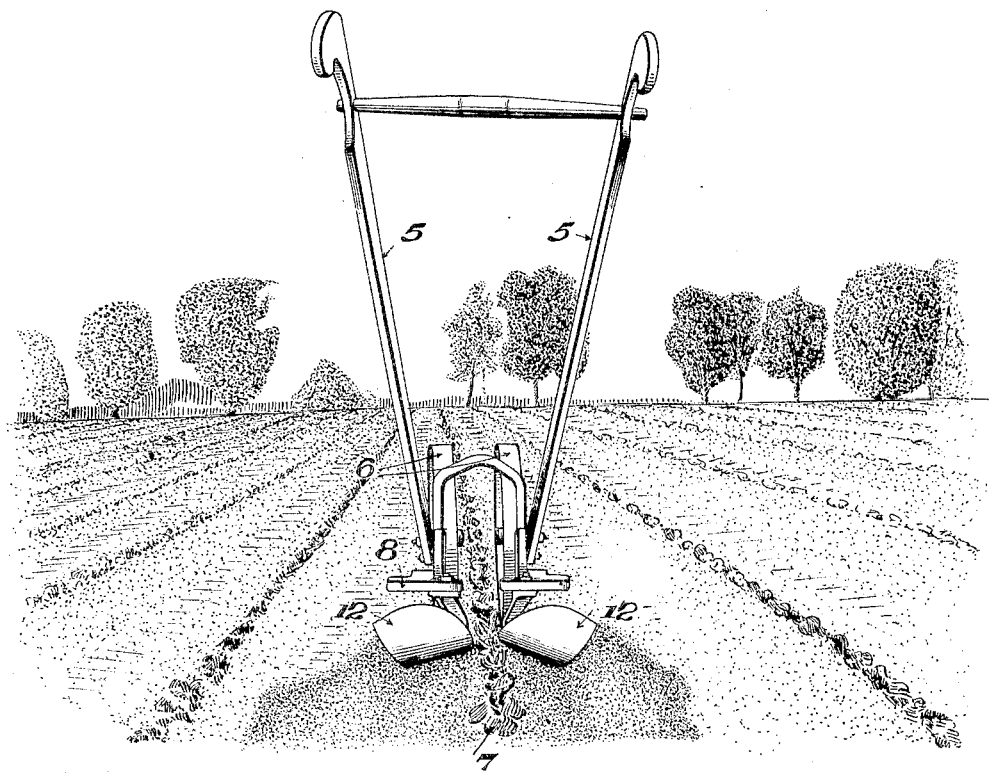
Figure 2:
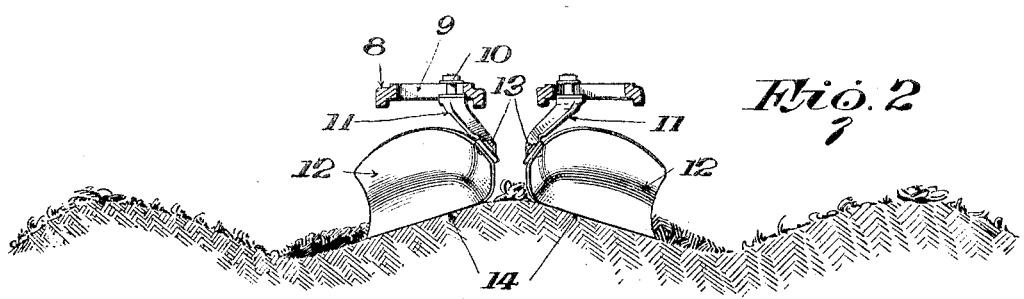

Other objects and advantages reside in the special construction, combination and arrangement of the various elements forming the invention, as more fully hereinafter described and claimed, reference being had to the accompanying drawings forming part hereof, wherein like numerals refer to like parts throughout the specification and in which Figure 1 is a rear elevational view of a two-wheel hoe showing my invention in operative position thereon, Figure 2 is a sectional view through the plant row with the blades shown in rear elevation and illustrating the manner in which the weeds are removed from the sides of the row and turned into the furrow under the soil, Figure 3 is a top plan view of a pair of blades, Figure 4 is a sectional view through one of the blades taken along a line 4—4 of Figure 3, Figure 5 is a perspective view of a pair of the blades in operative association and showing the forward side thereof, Figure 6 is a side elevational view of one of the blades illustrating the manner of adjusting the blade upon its standard through the use of a wedge member, Figure 7 is a perspective view of the wedge member, Figure 8 illustrates the blank cut from sheet material and from which the blade is formed, and Figure 9 is a perspective view of the blade.

In the present embodiment of the invention and with particular reference to Figures 1 and 2 of the drawings, the device is shown in operation upon a two-wheel hoe of the hand operated type indicated generally at 5 with the wheels 6 arranged to travel at opposite sides of the row of plants 7 being worked.

The hoe includes a pair of frames 8 disposed at opposite sides of the plants immediately rearward of the wheels, each of the frames being provided with transversely extended slotted openings 9 through which bolts 10 are adjustably secured for attaching the upper ends of the blade standards 11 to the frames. The lower ends of the standards have the hoe blades 12 secured thereto by bolts 13, the blades thus being adapted for adjustment transversely so that the space between the respective blades may be increased or decreased, as desired, depending upon the character of the plants being worked.

The blades 12 are illustrated in detail in Figures 3 to 8, inclusive, of the drawings, and are constructed from a blank stamped or cut from substantially heavy gauge sheet metal in a shape as illustrated in Figure 8. One edge of the blade is bevelled as shown at 14 to form a cutting edge on the blade and the side of the blank opposite from said cutting edge is notched as shown at 15 whereby to define relatively small and large sections 16 and 17, respectively, upon the blank. The notch 15 permits the small section 16 to be bent at substantially right angles with respect to the larger section 17, and when so arranged the notched edges of the blank may be brought together and spot-welded as shown at 18 in Figure 7 of the drawing. A pair of apertures 19 are formed adjacent the upper edge of the small section 16 for receiving the bolts 13 carried by the standard.

Accordingly when the blank is shaped in the manner indicated and the blades are secured to the standards the smaller section 16 will be disposed in spaced parallel relation at opposite sides of the row of plants and the larger section 17 of the blade will extend laterally at a slightly rearwardly inclined angle therefrom.

The upper edge of the larger section 17 is curved from its notched edge outwardly toward its free edge and is also bent forwardly as shown more clearly at 20 in Figure 3 of the drawings so that the upper edge of the blade will be disposed in overhanging relation with respect to the cutting edge 14 thereof. The enlarged section 17 with the overhang 20 at its upper edge, thus in effect constitutes a sweep for turning under any soil scraped up by the cutting edge of the blade 14 as the same passes from the outer edge of the blade. The apertures 19 are also positioned as to support the blade upon the standard with the cutting edge 14 inclined downwardly at an angle substantially equal to the slope of the row being worked. When desired, the blade may be supported substantially horizontally, as shown in the full line position of Figure 6 by inserting a wedge member 21 between the blade and the standard 11, said wedge member being provided with apertures 22 for receiving the bolts 13.

It will be readily understood from the foregoing that upon mounting the blades in a desired position upon the frame of the hoe and straddling the row of plants 7 that all foreign growths upon the sides of the row will be cut by the edge 14 of the blade and turned over into the furrows at the respective sides of the row and covered with the soil from the sweep of the blade. By reason of this action the weeds and grass will be completely destroyed. While the present embodiment of the invention illustrates a practical method of constructing the blades from sheet metal, it is to be understood that the same may also be formed in any other suitable manner, as for instance, by employing presses of a type well known in the art for stamping or shaping pieces of sheet metal cut from a suitable pattern into the desired form.

It is obvious that the invention is susceptible of various changes and modifications without departing from the spirit thereof or the scope of the appended claims, and I accordingly claim as my own all such forms of the invention to which I am entitled.

I claim:

1. A hoe blade constructed of sheet material and attachable in a substantially upright position, said blade comprising a guard section formed by bending one end of the material angularly in a direction forwardly of the direction of travel of the blade, and a sweep section extending rearwardly and outwardly from said guard section, the lower edge of said sweep section and a portion of the lower edge of said guard section constituting a continuously formed soil scraper, said sweep section having its forward face concaved with its upper edge overhanging the front of the blade and receding toward the outer edge of the blade whereby to receive the soil from the scraper for turning the same under.

2. A hoe blade formed of sheet material of predetermined configuration and curved along a longitudinal line into a substantially concavo-convex formation, said blade including a forwardly extending guard section attachable at its upper edge in an upright position and a sweep section bent angularly from the guard along a vertical line and extending rearwardly and outwardly from said guard, said guard having its lower edge receding rearwardly to provide an elevated prow end, said sweep section having its lower edge beveled to form a soil scraper in continuation of the lower edge of the guard, said sweep section also having a forwardly overhanging upper edge receding toward the outer edge of the blade whereby to receive the soil from the scraper for turning the same under.

3. A hoe blade formed of a single sheet of material of predetermined formation having its lower edge plane and its upper edge formed with a downwardly extending notch, said blade being bent along a horizontal line in the plane of the inner end of the notch to provide the surfaces of the blade of a concavo-convex formation, said blade also being bent angularly along a vertical line to close the edges of the notch and to form a forwardly extending guard at one portion of the blade and a sweep at its rear portion, said sweep having its lower edge beveled to form a soil scraper in continuation of the lower edge of the guard, said sweep section also having a forwardly overhanging upper edge receding toward the outer edge of the blade whereby to receive the soil from the scraper for turning the same under.

In testimony whereof I affix my signature.

GEORGE M. HARRISON.